(12) United States Patent
Von der Assen et al.

(10) Patent No.: US 9,174,807 B2
(45) Date of Patent: Nov. 3, 2015

(54) METHOD FOR CLEANING A CONVEYOR FOR AGRICULTURAL PRODUCTS AND CONVEYOR FOR AGRICULTURAL PRODUCTS

(75) Inventors: Markus Von der Assen, Steinfeld (DE); Rudi Fick, Diepholz (DE)

(73) Assignee: Lubing Maschinenfabrik Ludwig Bening GmbH & Co. KG, Barnstorf (DE)

(*) Notice: Subject to any disclaimer, the term of this patent is extended or adjusted under 35 U.S.C. 154(b) by 0 days.

(21) Appl. No.: 13/880,494

(22) PCT Filed: Aug. 24, 2011

(86) PCT No.: PCT/EP2011/004247
§ 371 (c)(1),
(2), (4) Date: Mar. 28, 2014

(87) PCT Pub. No.: WO2012/052083
PCT Pub. Date: Apr. 26, 2012

(65) Prior Publication Data
US 2014/0311862 A1    Oct. 23, 2014

(30) Foreign Application Priority Data

Oct. 22, 2010 (DE) .......................... 10 2010 049 115
Dec. 23, 2010 (DE) .......................... 10 2010 056 082

(51) Int. Cl.
*B65G 45/22* (2006.01)
*A01K 31/16* (2006.01)
(Continued)

(52) U.S. Cl.
CPC .............. *B65G 45/22* (2013.01); *A01K 31/165* (2013.01); *B08B 3/123* (2013.01); *B65G 45/105* (2013.01)

(58) Field of Classification Search
CPC .... A01K 31/165; B65G 45/22; B65G 45/105; B08B 3/123
USPC .......................................... 198/493–499, 848
See application file for complete search history.

(56) References Cited

U.S. PATENT DOCUMENTS 1,194,250 A * 8/1916 Smits ............................ 210/158
3,155,102 A * 11/1964 Niederer, Jr et al. ............. 134/72
(Continued)

FOREIGN PATENT DOCUMENTS

| EP | 2100830 A1 | 9/2009 |
|---|---|---|
| FR | 2911332 A1 | 7/2008 |

(Continued)

OTHER PUBLICATIONS

Japan Patent Office, Official Action (translation into German)(for related application), Mar. 9, 2015.

*Primary Examiner* — Mark A Deuble
(74) *Attorney, Agent, or Firm* — Laurence P. Colton; Smith Risley Tempel Santos LLC

(57) ABSTRACT

A method for cleaning a conveyor for agricultural products, such as eggs, and a conveyor for agricultural products, in which contaminants that adhere firmly to the conveyor are removed by the use of an ultrasonic cleaning bath into which a section of the conveyor is dipped with the aid of a deflecting unit. During the normal revolution of the conveyor chain, cleaning of the conveyor chain is carried out even during running operation of the conveying system by means of ultrasound and suitable cleaning agent. A conveyor chain having a multiplicity of rods that are connected to one another via chain links is transported in individual conveying segments of the conveyor. Lying on the conveyor chain, the agricultural products are transported. Deposits of contaminants onto the conveyor unavoidably occur during operation, such as, in particular, as a result of litter or feathers.

13 Claims, 3 Drawing Sheets

(51) Int. Cl.
*B08B 3/12* (2006.01)
*B65G 45/10* (2006.01)

(56) References Cited

U.S. PATENT DOCUMENTS

| | | | | |
|---|---|---|---|---|
| 3,167,052 | A | * | 1/1965 | Kuhlmann ............... 119/337 |
| 3,440,973 | A | * | 4/1969 | Lanham, Jr. et al. ......... 99/483 |
| 3,695,170 | A | * | 10/1972 | Ehrenberg ............... 99/386 |
| 4,194,922 | A | * | 3/1980 | Gransell et al. ............ 134/1 |
| 4,224,464 | A | * | 9/1980 | Bunnell et al. ............ 174/653 |
| 4,709,713 | A | * | 12/1987 | Kuhl .................... 134/72 |
| 4,928,584 | A | * | 5/1990 | Young ................... 99/289 T |
| 5,660,145 | A | * | 8/1997 | Rumbaugh ............... 119/440 |
| 2004/0089179 | A1 | | 5/2004 | Link |

FOREIGN PATENT DOCUMENTS

| | | |
|---|---|---|
| JP | S58201502 A | 11/1983 |
| JP | H06127665 A | 5/1994 |
| JP | H06212467 A | 8/1994 |
| JP | H01068511 A | 3/2001 |
| JP | 2001233442 A | 8/2001 |
| JP | 2002321813 A | 11/2002 |
| JP | H10071089 A | 4/2010 |
| WO | 03068422 A1 | 8/2003 |

* cited by examiner

METHOD FOR CLEANING A CONVEYOR FOR AGRICULTURAL PRODUCTS AND CONVEYOR FOR AGRICULTURAL PRODUCTS

BACKGROUND OF THE INVENTION

1. Technical Field

The invention relates to a method for cleaning a conveyor for agricultural products, in particular eggs. Moreover, the invention relates to a conveyor for agricultural products, in particular eggs.

2. Prior Art

Transport systems for agricultural products, in particular for the transport within a production facility, are of great importance for economical and frictionless production. Here, transport or conveying systems which are to have particular requirements placed on them are used for handling and transporting eggs, in particular hens' eggs in laying farms.

The conveying systems which are discussed here are distinguished by a circulating conveying member which is configured, for example, as a conveyor belt or preferably as a conveyor chain. Here, the conveyor chain comprises a multiplicity of rods of identical longitudinal dimensions which have, at both ends, chain links which are in engagement with respectively corresponding chain links of adjacent rods. To this end, the adjacent chain links are arranged generally so as to be turned by in each case 90° with respect to the next chain link. Here, the spacing of adjacent rods is smaller than the typical minimum diameter of the short axis of the eggs to be transported. Said eggs therefore lie on in each case two rods, without falling between them. In order to make softer support of the eggs possible on the rods which run substantially horizontally, said rods can be provided with a shock-absorbing coating, for example made from plastic.

The conveying system can be adapted to the local conditions of the production facility by way of a multiplicity of different elements and separate conveyor chains. For example, curved segments, inclined segments and the like can be provided.

In particular, in order to satisfy the food hygiene regulations, it is necessary to clean the conveying system for eggs and, in the process, in particular, the conveying member at regular intervals. To this end, for example, complicated manual cleaning can take place or else a broom-like stripper can be installed in the region of the conveyor chain. Said stripper ensures that loosely adhering contaminants, such as feathers or litter, are removed.

It is a disadvantage of the known cleaning method by stripper that merely loosely adhering contaminants can be removed in this way. Contaminants which are dried on or adhere strongly, such as microbial adhesions, in particular of microorganisms such as bacteria, can be removed only insufficiently in this way.

BRIEF SUMMARY OF THE INVENTION

The invention is therefore based on the object of providing a method for cleaning a conveyor for agricultural products, in particular eggs, by way of which method a cleaning action is achieved which is substantially improved in comparison with the prior art.

A method for achieving this object is a method for cleaning a conveyor for agricultural products, in particular eggs, the conveyor having a movable, closed and/or circulating conveying member, in the form of a conveyor belt or a conveyor chain for conveying the agricultural products, comprising cleaning the conveying member at least substantially continuously, wherein the cleaning is carried out by means of an ultrasonic cleaning bath. Accordingly, the cleaning of the conveying member or the conveyor chain takes place by means of an ultrasonic cleaning bath. An ultrasonic cleaning bath detaches contaminants from articles to be cleaned, such as the conveying member here, by cavitation effects in the bath which is excited by ultrasound being utilized. This is caused by a sufficiently great amplitude of the sonic waves in the bath, which leads to spontaneous formation and subsequent dissolution of gas bubbles. The shock waves which are produced as a result detach adhering contaminants from the surface of the article to be cleaned. Here, the cleaning can take place, in particular, at least virtually without manual intervention.

Merely one part section of the conveyor or of the conveying member, in particular of the conveyor chain, is preferably dipped into the ultrasonic cleaning bath. The remaining section or the remainder of the conveying member is preferably left outside the ultrasonic cleaning bath. The conveying member is preferably guided with a part section through the ultrasonic cleaning bath, preferably continuously. The circulating conveying member is therefore moved once completely through the ultrasonic cleaning bath during one complete revolution. This affords the advantage that merely a comparatively small ultrasonic cleaning bath has to be provided, in order to clean the conveying member. In particular, the weight, length and depth of the ultrasonic cleaning bath therefore merely have to be suitable for receiving a section of the conveying member or of the conveyor chain. A volume of approximately between 50 l and 2000 l, preferably approximately from 200 l to 500 l, preferably approximately 250 l, is preferably sufficient for this purpose.

Water is preferably used as liquid for the ultrasonic cleaning bath. Water affords the advantage of cavitation with gas bubbles which are produced and collapse again, from which the cleaning action of the ultrasonic bath results. In particular, cleaning agents, disinfectants or the like can additionally be added to the liquid. The cleaning action is therefore firstly increased and supplementary combating of microbiological contaminants is secondly achieved.

The ultrasonic cleaning bath is preferably deposited in a vessel which, in particular, can be moved. In order to make the cleaning of the conveying member possible, the vessel is moved into the region of the conveying member in such a way that at least one section of the conveying member can be dipped into the ultrasonic cleaning bath. Conversely, the vessel can preferably be moved out of the region of the conveying member again after termination of the cleaning operation. A plurality of separate conveying members can therefore be cleaned, for example, by way of a single cleaning bath. Moreover, the ultrasonic cleaning bath can thus be cleaned itself or replaced in a simple way.

Ultrasonic waves are generated in the liquid in the ultrasonic cleaning bath. To this end, in particular, at least one, preferably a plurality of ultrasonic generators or ultrasonic transducers are provided. The liquid of the ultrasonic cleaning bath is excited by the ultrasonic generator or generators or ultrasonic transducer or transducers, in particular, on the wall side and/or floor side of the vessel of the ultrasonic cleaning bath. To this end, the ultrasonic generators or ultrasonic transducers are preferably actuated by an associated control or driver unit and are supplied to this end with preferably electric energy.

It is further preferred that the ultrasonic cleaning bath is heated to a predefined temperature or is kept at this temperature. The temperature is preferably more than 50° C., preferably between 60° C. and 100° C., further preferably between 70° C. and 80° C. In particular, the cleaning bath is heated at least temporarily. The increase in the temperature in comparison with room temperature ensures firstly an improvement in the cleaning action and secondly killing of microbes. Finally, a drying effect also results for the cleaned conveyor chain links which emerge out of the ultrasonic cleaning bath.

It is further preferred that the conveying member is pre-cleaned and/or post-cleaned by at least one stripper. Coarse or loosely adhering contaminants can therefore be removed, in particular, in advance, in order not to contaminate the ultrasonic cleaning bath unnecessarily. As an alternative, adhesions which have previously not been detached completely by the cleaning bath but have been softened as a result can possibly be eliminated in a mechanical way before, for example in a second passage, the remainder is eliminated in the ultrasonic cleaning bath. It is further preferred that the conveying member is dried, in particular, after the cleaning, preferably by way of a hot air or warm air drying system.

It is particularly preferred that a section of the conveying member or a number of conveyor chain links are deflected by a deflecting unit onto a preferably loop-shaped path. To this end, the deflecting member has, in particular, at least one deflection member, such as, in particular, at least one deflection roller or deflection roll. Three or even five deflection members are preferably provided. In this way, an (open) loop-shaped or U-shaped circulation of the conveying member in the region of the deflecting unit can be achieved. Two sections of the conveying member preferably bear against a central deflection member. Here, they preferably run parallel to one another in opposite directions. In addition, these two sections which are arranged parallel to one another run in a deflected manner through further, at least two deflection members at an angle with respect to those sections of the conveying member which are adjacent to said additional deflection members. The deflecting unit with the two parallel sections of the conveying member is oriented, in particular, in a vertical direction, in particular so as to point vertically downward. To this end, the central deflection member is preferably arranged on a movably mounted arm of the deflecting unit, in particular on its end region.

It is further preferred that the conveying member, in particular the deflecting unit or its arm is moved with the deflected section of the conveying member for cleaning into the ultrasonic cleaning bath. To this end, the component is preferably pivoted, displaced or, in particular, moved linearly. This movement preferably takes place in the vertical direction. In the case of a movement of the deflecting unit or of the arm, in particular, the central deflection member is moved in the corresponding direction. The conveying member which runs around said deflection member then moves correspondingly in the same direction. To this end, however, it can preferably be necessary that the conveying member is held at least lightly under tension by means of a preferably automatic tensioning device, with the result that it bears against the deflection members.

The conveying member is deflected, in particular, in the region of a lower run. In contrast to the upper run, on which the agricultural products or the eggs are transported, the lower run runs empty as a return of the conveying member which is configured as a closed loop. If the deflection takes place in this region, cleaning can in principle also take place during running operation. The deflecting unit for dipping a section to be cleaned is height-adjusted, in particular, in the region of the deflecting unit.

The object which was set at the outset is likewise achieved by a conveyor for agricultural products, in particular eggs, having at least one movable closed and/or circulating conveying member, in the form of a conveyor belt or a conveyor chain for conveying the agricultural products, whereby a section of the conveying member is dipped into an ultrasonic cleaning bath in such a way that the entire conveying member is cleaned during a complete revolution.

The conveyor preferably has at least one movable, in particular closed and/or obliquely circulating conveying member, preferably a conveyor belt or a conveyor chain for conveying the agricultural products. Said conveyor is distinguished by the fact that at least one section of the conveying member can be dipped into an ultrasonic cleaning bath or can be brought into engagement with an ultrasonic cleaning bath in such a way that the entire conveying member can be cleaned by one complete revolution. This means that the conveying member, even if it is arranged only with one section in the ultrasonic cleaning bath, can be cleaned over its entire length by the normal circulating transport of the conveying member.

It is further preferred that the conveying member is assigned a deflecting unit. Said deflecting unit is assigned, in particular, to a lower run of the conveying member. The arrangement of a deflecting unit in the lower run, that is to say the return run of the conveying member, does not disrupt the normal operation of the conveyor, whereas an arrangement in the upper run, on which the agricultural products to be transported, such as eggs, in particular, are deposited, makes every change in the course disruptive. The conveying member preferably runs in a loop-shaped or U-shaped manner in the region of the deflecting unit. This means that the conveying member is merely guided along a detour. To this end, the deflecting unit preferably has at least one deflection member, in particular deflection roller or deflection roll.

Preferably at least one of the deflection members is arranged as central deflection member on an arm of the deflecting unit in such a way that it deflects the conveying member by 180°. The two sections of the conveying member which adjoin the central deflection member therefore run at least approximately parallel and in opposite directions to one another or to the longitudinal extent of the arm, that is to say, in particular, in a loop-shaped or U-shaped manner. The central deflection member and/or the arm of the deflecting unit are/is preferably height-adjustable. Raising or lowering of the deflecting unit or its arm and therefore of the articulated section or sections of the conveying member is therefore achieved. An, in particular, linearly displaceable or pivotable arrangement of the deflecting unit or its arm is preferably provided in order to raise or lower the arm or the deflection member. The raising or lowering can take place manually or else by motor. In order to ensure the contact of the conveying member with a deflection roller and otherwise reliable transport along the conveying part of the conveyor, a device for length compensation or for tensioning the conveying member can be provided, in particular. This device can be capable of compensating for the change in length of the conveying member by displacement of the arm of the deflecting unit into the two extreme positions. As an alternative, the conveying member is preferably tensioned merely in one position.

It is further preferred that the deflecting unit or its arm is oriented so as to point downward, that is to say in an at least approximately vertical direction. In this way, the displaceable or pivotable deflecting unit can be lowered, in particular, in order to insert or dip the arm with the section of the conveying member into a cleaning bath, in particular an ultrasonic cleaning bath, and can be raised accordingly in order to remove the cleaning bath.

The conveyor is preferably assigned at least one stripper. A stripper of this type which can be configured, for example, in a broom-shaped or similar manner serves to clean the conveying member of contaminants which are coarse or, in particular, adhere lightly. The stripper can be arranged in front of and/or behind the ultrasonic cleaning bath in the movement direction of the conveying member. In the first case, it ensures pre-cleaning of the conveying member, in order to prevent excessive contamination of the cleaning bath. Otherwise, contaminants which are, for example, already partly detached but not yet completely removed can therefore be removed after passing through the cleaning bath.

The conveying member is particularly preferably of continuously circulating configuration. A uniform conveying rate can therefore be ensured and, secondly, at the same time the cleaning process can also be carried out continuously. In particular, cleaning can therefore also take place during the running operation of the conveyor as a result of the arrangement of the section to be cleaned in the lower run of the conveying member. At least one drive unit is preferably provided, in order to drive the conveying member. The cleaning can therefore be carried out in an at least virtually fully automatic manner.

The object which was stated at the outset is also achieved by a system comprising a conveyor, as described above, and an ultrasonic cleaning bath. The system is distinguished by the fact that a section of the conveyor or of the conveying member of the latter can preferably be dipped into the ultrasonic cleaning bath in the region of the deflecting unit in order to clean the entire conveying member by preferably continuous circulation of the entire conveying member. The ultrasonic cleaning bath is excited, in particular, by ultrasonic transducers or ultrasonic generators in order to generate the cleaning action. To this end, a liquid is used, preferably water, possibly supplemented by cleaning agent, disinfectant or the like. In particular, the conveying member also passes through the ultrasonic cleaning bath completely as a result of one complete revolution. This ensures that the entire conveying member can be cleaned in the comparatively small ultrasonic cleaning bath.

BRIEF DESCRIPTION OF THE DRAWINGS

In the following text, preferred exemplary embodiments of the invention will be described in greater detail using the drawing, in which.

DETAILED DESCRIPTION OF PREFERRED EMBODIMENTS

Figure 1:
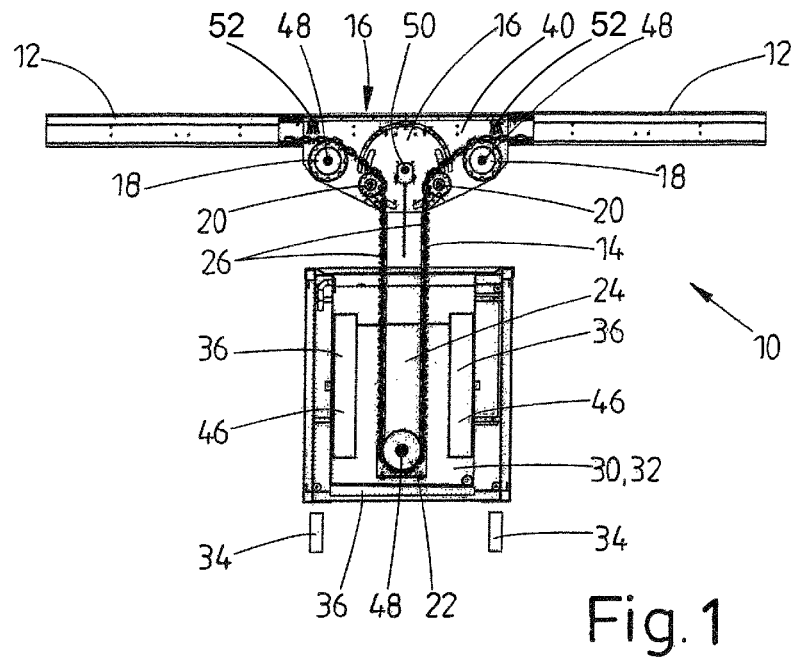
FIG. 1 shows a detail of a conveyor having a deflecting unit according to the first exemplary embodiment, in a sectional view.
Figure 2:
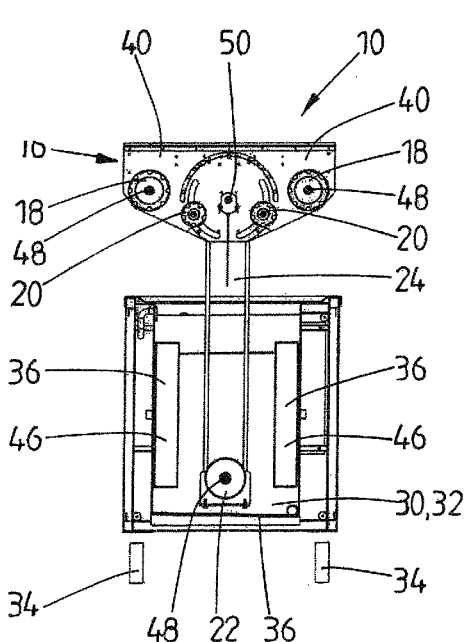
FIG. 2 shows an illustration of the first exemplary embodiment with an extended deflecting unit without conveying member, in a side view.
Figure 3:
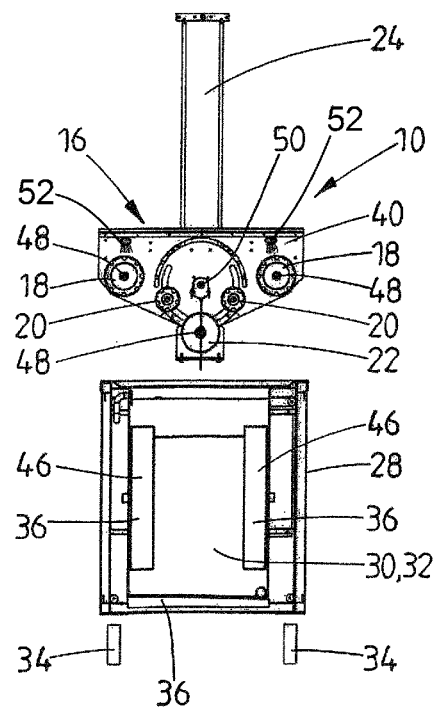
FIG. 3 shows the illustration from FIG. 2 with a retracted deflecting unit.

FIGS. 1 to 3 show a first exemplary embodiment of the invention. Here, a detail of a conveyor 10 can be seen which has two conveying segments 12. The conveying segments 12 are arranged so as to run horizontally in a common plane. Since it is a section of a conveyor 10, adjacent separate segments, but also the conveying segments 12 are also to be configured, for example, as curved segments, inclined sections or the like.

A conveyor chain 14 is guided laterally in the interior of the conveying segments 12 as conveying member. Furthermore, the figures show a deflecting unit 16 which deflects the conveyor chain 14 from its horizontal course within the conveying segments 12. To this end, a plurality of deflection rollers 18, 20 and 22 are provided.

The deflection rollers 18, 20, 22 which are shown here are arranged in each case in pairs on an axle 48. The deflection rollers 18, 20, 22 themselves serve to guide the conveyor chain 14, in particular chain links 44 on rods 42. As an alternative, however, deflection rolls or the like can also be provided. The deflection rollers 18, 20, 22 have a surface profiling which corresponds accordingly to the conveyor chain 14. Here, the deflection rollers 18, 20, 22 are arranged in each case as pairs on a common axle; even if only one roller or deflection roller 18, 20, 22 is spoken of here, in general both are meant. Otherwise, the construction is as described above. The following comments apply essentially also to the first exemplary embodiment in a corresponding manner.

The upper deflection rollers 18 and 20 serve to deflect the conveyor chain 14 from the region of the conveying segments 12 to a vertical course which is parallel to one another. Accordingly, in each case two deflection rollers 18 and 20 are provided. The central deflection roller 22 is situated on a lower end region of an arm 24 of the deflecting unit 16. The conveyor chain 14 runs around said central deflection roller 22, which results overall in the two sections 26 of the conveyor chain 14 which run in parallel.

The arm 24 with the two sections 26 of the conveyor chain 14 which are parallel to it runs predominantly in the interior of a vessel 28 for an ultrasonic cleaning bath 30, which vessel 28 can be moved in principle but is placed at this position here. The vessel has an inner chamber 32, into which water is filled as cleaning liquid with additives. In order for it to be possible to handle the vessel 28 more easily and, in particular, to move it away, a plurality of rollers or wheels 34 are provided.

In the region of the chamber 32, firstly on the floor and secondly on the side walls here, the vessel 28 has a plurality of ultrasonic transducers 36 which are integrated into boxes. Said ultrasonic transducers 36 serve to excite cleaning liquid, in particular the water, in the interior of the chamber 32 as a result of ultrasonic vibrations. Moreover, a control unit 38 is also provided on the outside of the vessel 28 in order to actuate the ultrasonic transducers 36.

In order for it to be possible to remove the arm 24 out of the interior of the vessel 28, that is to say out of the chamber 32, for example in order to use the vessel 28 at another location, the height of the arm 24 can be adjusted. It can be seen, for example, in FIG. 3 that the arm 24 can be pulled upward almost completely with the deflection roller 22 in the region of a base plate 40 of the deflecting unit 16. By virtue of the fact that the arm 24 then no longer protrudes into the interior of the vessel 28, the vessel 28 can be moved away laterally. For renewed use of the ultrasonic cleaning bath 30, the vessel 28 can be placed correspondingly again below the arm 24, in order to lower the latter into the chamber 32 again.

The conveyor 10 is preferably assigned at least one stripper 52. A stripper 52 of this type which can be configured, for example, in a broom-shaped or similar manner serves to clean the conveying member of contaminants which are coarse or, in particular, adhere lightly. The stripper 52 can be arranged in front of and/or behind the ultrasonic cleaning bath 30 in the movement direction of the conveying member. In the first case, the stripper 52 ensures pre-cleaning of the conveying member, in order to prevent excessive contamination of the ultrasonic cleaning bath 30. Otherwise, contaminants which are, for example, already partly detached but not yet completely removed can therefore be removed after passing through the ultrasonic cleaning bath 30.

FIGS. 4 to 10 show a second exemplary embodiment of the invention. This differs from the first exemplary embodiment substantially only by virtue of the fact that the conveying segments 12 which are likewise arranged in a common plane are now not oriented horizontally, but rather run obliquely at an angle of 50° with respect to the horizontal. As a result, the method of operation of the deflecting unit 16 with the multiplicity of deflection rollers 18, 20 and 22 can be described in an improved manner. The deflecting unit 16 has a pivot axis 50 for pivoting into a suitable position relative to the adjacent conveying segments 12.

Figure 4:
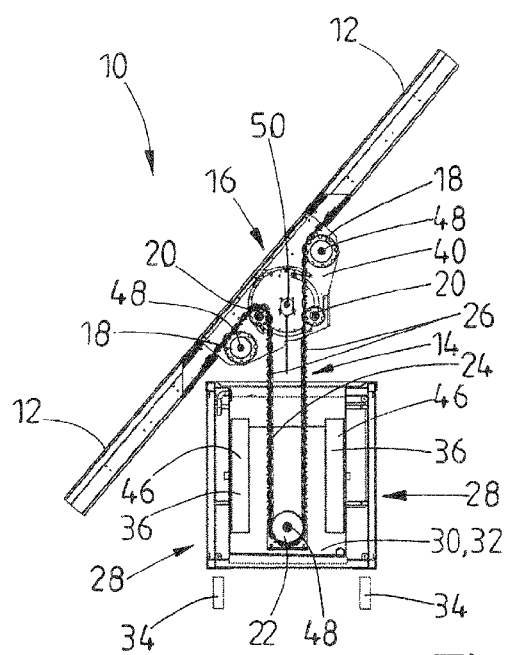
FIG. 4 shows a detail of a conveyor according to a second exemplary embodiment with an extended deflecting unit, in a sectional view.
Figure 5:
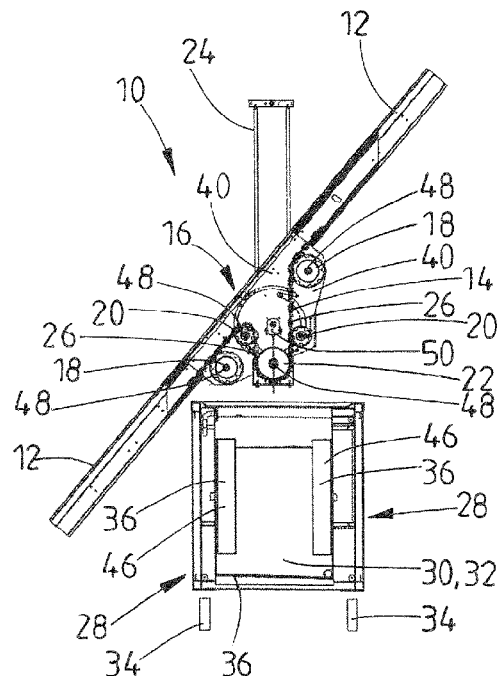
FIG. 5 shows the illustration from FIG. 4 with a retracted deflecting unit.
Figure 6:
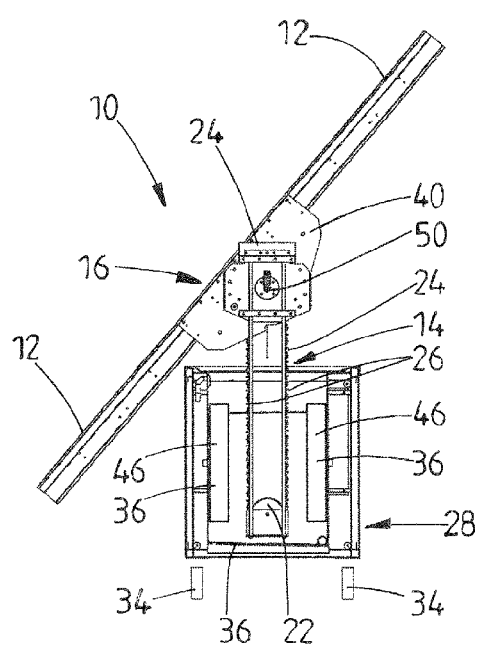
FIG. 6 shows the illustration from FIG. 4 in a side view.
Figure 7:
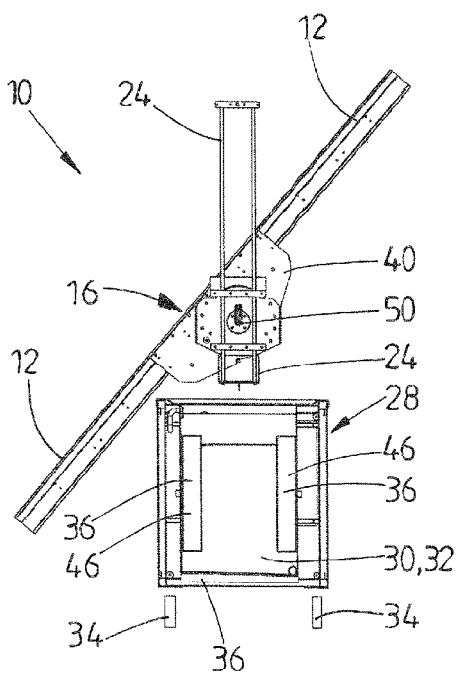
FIG. 7 shows the illustration from FIG. 5 in a side view.

It can be seen in FIG. 4, for example, that the conveyor chain 14 runs over the respective deflection rollers 18 in the region of the deflecting unit 16. In this case, the left-hand deflection roller 20 serves as actual deflection roller for the left-hand section 26 of the conveyor chain 14. In this case, however, the deflection roller 18 is responsible for the right-hand section 26. The arrangement of the deflection rollers 18 and 20 in the form which is shown here leads to the two sections 26 running at all times parallel to one another at the spacing of the diameter of the deflection roller 22, at least in the case of all orientations between the horizontal orientation and the angle of 50° which is shown here.

The geometry of the arrangement of the deflection rollers 18 and 20 is also not changed in principle by the arm 24 being pulled upward, with the result that this is possible without problems in order to release the vessel 28 with the ultrasonic cleaning bath 30.

The section of the conveyor chain 14 which is shown here is a section of the lower run, that is to say of that part of the conveyor chain 14 which runs back empty and is correspondingly loaded with payload. Otherwise, the agricultural products which lie on it would also be damaged in the region of the arm 24. Otherwise, the arrangement of the deflecting unit 16 in the lower run ensures that it is also possible to run through the ultrasonic cleaning bath 30 during normal operation of the conveyor 10. The conveyor chain 14 can be held under tension in every position or location of the deflecting unit 16 by it being possible for a tensioning device for the conveyor chain 14 to be provided at another location of the conveyor 10, which tensioning device is capable of compensating for a complete movement of the arm 24 between its two extreme positions in the downwardly extended and upwardly retracted state. Accordingly, the conveyor chain 14 still bears against the central deflection roller 22 even in the case of a completely retracted arm 24, and can thus be pulled out of the vessel 28. In the upper position, the arm 24 with the deflection roller 20 is situated in the vicinity of a base plate 40 of the deflecting unit 16. Without a tensioning device or chain tensioner, the conveyor chain 14 is tensioned in the lower position merely in the case of a completely extended arm 24.

Figure 8:
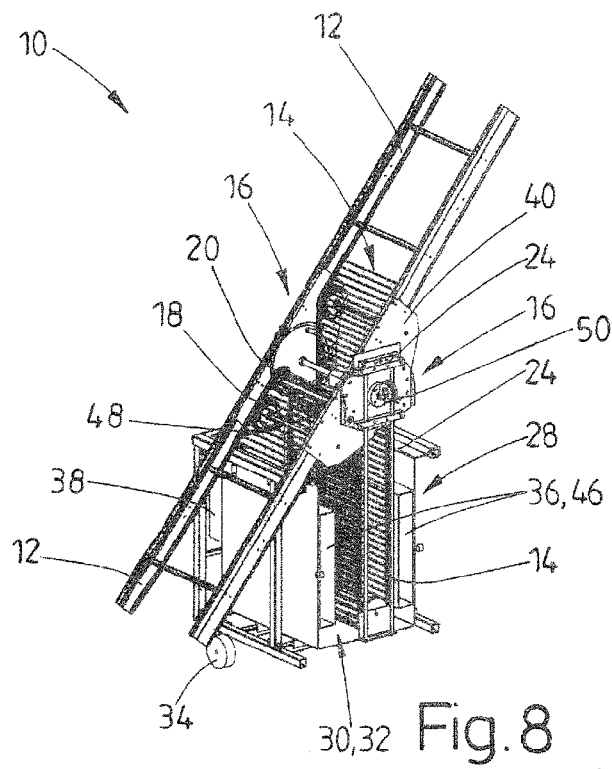
FIG. 8 shows a perspective view of the conveyor according to the second exemplary embodiment with an extended deflecting unit.
Figure 10:
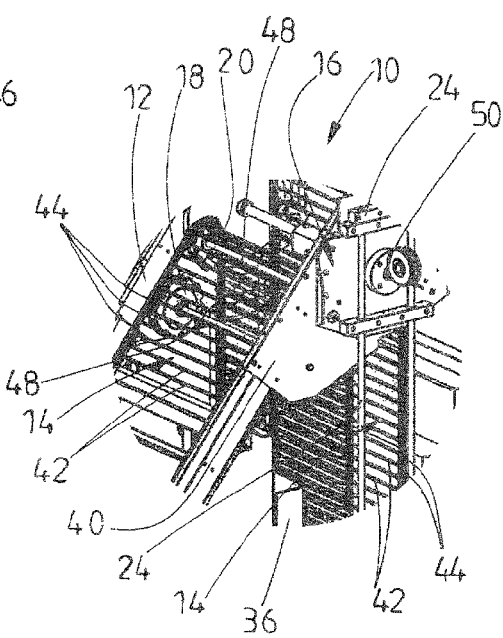
FIG. 10 shows a detailed view from FIG. 8.
Figure 9:
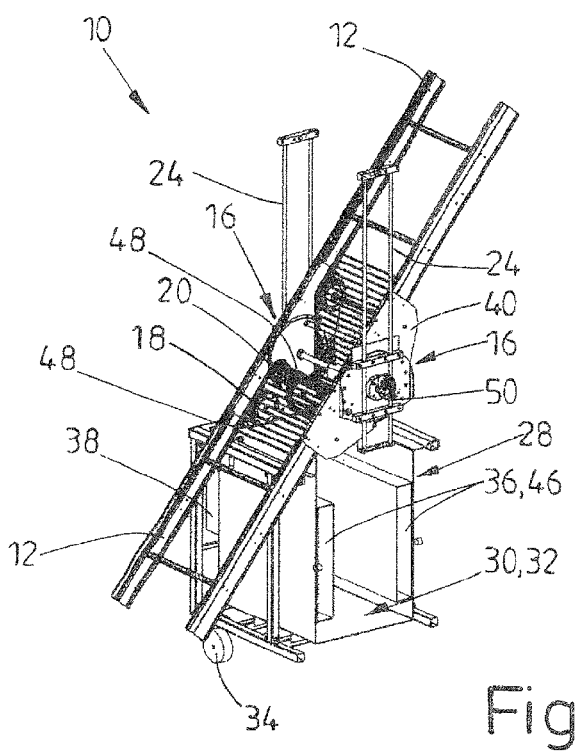
FIG. 9 shows the illustration from FIG. 8 with a retracted deflecting unit.

In the three-dimensional illustration of FIGS. 8 and 9 and, in particular, in the detailed view of FIG. 10, moreover, individual rods 42 of the conveyor chain 14 can be seen. In all the exemplary embodiments which are shown here, the conveyor chain 14 which is shown here is at least substantially identical. Accordingly, in each case chain links 44 which are in engagement with the chain links 44 of the respectively adjacent rods 42 are fastened to the ends of the rods 42. To this end, adjacent chain links 44 are arranged such that they are offset or rotated with respect to each other in each case by 90°. On account of the sufficiently small spacing of the rods 42 from one another, the agricultural products, in particular normal hens' eggs, do not pass between the rods 42. Accordingly, they can be transported such that they rest on the top of the conveyor chain 14 comprising rods 42.

The method according to the invention functions as follows:

First of all, the arm 24 is moved into its upper position. This can take place, for example, manually, by the arm 24 being pulled upward in a simple manner. As an alternative, a mechanical, in particular motorized solution can also be provided, in which the arm 24 is pulled upward by a cable pull, a spindle drive or the like. It still bears against the lower deflection roller 22 which is situated at the top below the base plate 40 at this point in time. Accordingly, there is sufficient space below the arm 24 with the deflection roller 22, in order to move the vessel 28 with the ultrasonic cleaning bath 30 underneath and optionally to position it below.

On account of a chain tensioner which is possibly present at another location in the conveyor 10 and is not shown here, the conveyor chain 14 retains its tension. As an alternative, the conveyor chain 14 is tensioned merely in the case of a completely downwardly extended arm 24.

The vessel 28 with the ultrasonic cleaning bath 30 is correspondingly prepared, by a sufficient quantity of liquid, in particular water with possible additives, such as a cleaning agent or a disinfectant, being filled into the chamber 32. The vessel 28 is then moved into the region below the arm 24. The arm 24 can then be extended downward again in the reverse direction. Accordingly, the conveyor chain 14 is dipped together with the arm 24 into the ultrasonic cleaning bath 30.

In order to start the cleaning operation, the ultrasonic transducers 36 are then activated by the control unit 38. The ultrasonic cleaning bath 30 in the chamber 32 is then excited with ultrasound. On account of cavitations, that is to say as a result of the production and the dissolution of microscopically small gas bubbles in the liquid, a multiplicity of small shock waves occur in the ultrasonic cleaning bath, which in turn lead to contaminants on the conveyor chain 14 being detached. The cleaning action is assisted by the possibly added cleaning agent or disinfectant.

All the rods 42 with the chain links 44 of the conveyor chain 14 successively run through the ultrasonic cleaning bath 30 by the conveyor chain 14 then being driven on its transport path by a drive device (not shown here). After one complete revolution of the conveyor chain 14 which is closed in itself, all the rods 42 and chain links 44 have therefore been cleaned once. If the cleaning action is not yet sufficient, at least one further passage can also take place, for example. To this end, the liquid of the ultrasonic cleaning bath 30 can possibly be replaced.

In order to improve the cleaning action, the interior of the chamber 32 can be additionally heated. By setting a temperature of approximately from 70° C. to 80° C., in addition to the cleaning effect, the effect of the killing of microorganisms can additionally come to bear as a result of heat. In principle, the cleaning effect is likewise improved by the increased temperature.

An additional effect of the increased temperature consists in the fact that the rods 42 and chain links 44 of the conveyor chain 14 which have just left the ultrasonic cleaning bath 30 on account of the continuous passage of the conveyor chain 14 dry more quickly in the air, since they have an increased temperature in comparison with said air. The adhering water evaporates more rapidly at an increased temperature. Accordingly, the heating of the ultrasonic cleaning bath 30 by the heating elements 46 additionally improves the availability of the conveyor 10 overall, since the cleaning can take place, in particular, during running operation without water residues.

For example, litter from the coops, feathers, but also shells and other constituent parts of defective eggs, in particular their content, come into consideration as adhering contaminants on the conveyor chain 44. As soon as, above all, egg constituent parts dry, the deposits can be removed only with difficulty.

LIST OF DESIGNATIONS

10 Conveyor
12 Conveying segment
14 Conveyor chain
16 Deflecting unit
18 Deflection roller
20 Deflection roller
22 Deflection roller
24 Arm
26 Section
28 Vessel
30 Ultrasonic cleaning bath
32 Chamber
34 Wheel
36 Ultrasonic transducer
38 Control unit
40 Table top
42 Rod
44 Chain link
46 Heating element
48 Axle
50 Pivot axis
52 Stripper

The invention claimed is:

1. A conveyor for agricultural products, in particular eggs, having at least one movable closed and/or circulating conveying member, in the form of a conveyor belt or a conveyor chain (14) for conveying the agricultural products, and a deflecting unit, the conveying member comprising an articulated section, whereby the articulated section of the conveying member is lowered by the deflecting unit in order to insert the section of the conveying member into an ultrasonic cleaning bath (30) in such a way that the entire conveying member is cleaned during a complete revolution.

2. The conveyor for agricultural products as claimed in claim 1, wherein:
   a lower run of the conveying member is assigned the deflecting unit (16),
   the conveying member runs in a loop-shaped manner in the region of the deflecting unit (16),
   the deflecting unit (16) has an arm (24), and
   the deflecting unit (16) has at least one deflection member, namely a deflection roller (18, 20, 22) or deflection roll, one of the deflection members deflecting the conveying member by 180° as central deflection member or deflection roller (22) on the arm (24) of the deflecting unit (16),
   whereby two adjacent sections of the conveying member run at least approximately parallel and in opposite directions to one another or to the arm (24), and at least the central deflection member or the arm (24) is height-adjustable for raising or lowering of the deflecting unit (16) or the arm with the deflected section of the conveying member.

3. The conveyor for agricultural products as claimed in claim 2, wherein the deflecting unit (16) is oriented at least approximately so as to point vertically downward.

4. The conveyor for agricultural products as claimed in claim 1, wherein the conveyor member is assigned at least one stripper for cleaning coarse contaminants.

5. The conveyor for agricultural products as claimed in claim 1, wherein the conveying member is configured so as to circulate continuously by means of at least one drive unit.

6. The conveyor for agricultural products as claimed in claim 3, wherein the deflecting unit (16) is displaceable or pivotable with respect to the conveyor member in such a way that the deflecting unit (16) is configured for dipping into the ultrasonic cleaning bath (30).

7. The conveyor for agricultural products as claimed in claim 6, wherein the deflecting unit (16) displaceable or pivotable in the vertical direction.

8. The conveyor for agricultural products as claimed in claim 3, wherein the deflecting unit (16) has at least one deflection member (18, 20, 22).

9. The conveyor for agricultural products as claimed in claim 8, wherein the deflecting unit (16) has three deflection members (18, 20, 22).

10. The conveyor for agricultural products as claimed in claim 8, wherein the deflecting unit (16) has five deflection members (18, 20, 22).

11. The conveyor for agricultural products as claimed in claim 3, wherein the conveying member is guided in opposite directions in parallel to the arm (24), at least in sections.

12. The conveyor for agricultural products as claimed in claim 1, further comprising a drying device for drying the conveyor member.

13. The conveyor for agricultural products as claimed in claim 1, further comprising a tensioning device or a chain tensioner.

* * * * *